Feb. 9, 1971   H. E. WARD ET AL   3,561,263
FORCE AND MOMENT DYNAMOMETER
Filed Aug. 8, 1968   4 Sheets-Sheet 1

INVENTORS.
HOWARD E. WARD
MARI A. WOLF
By White & Haefliger
ATTORNEYS.

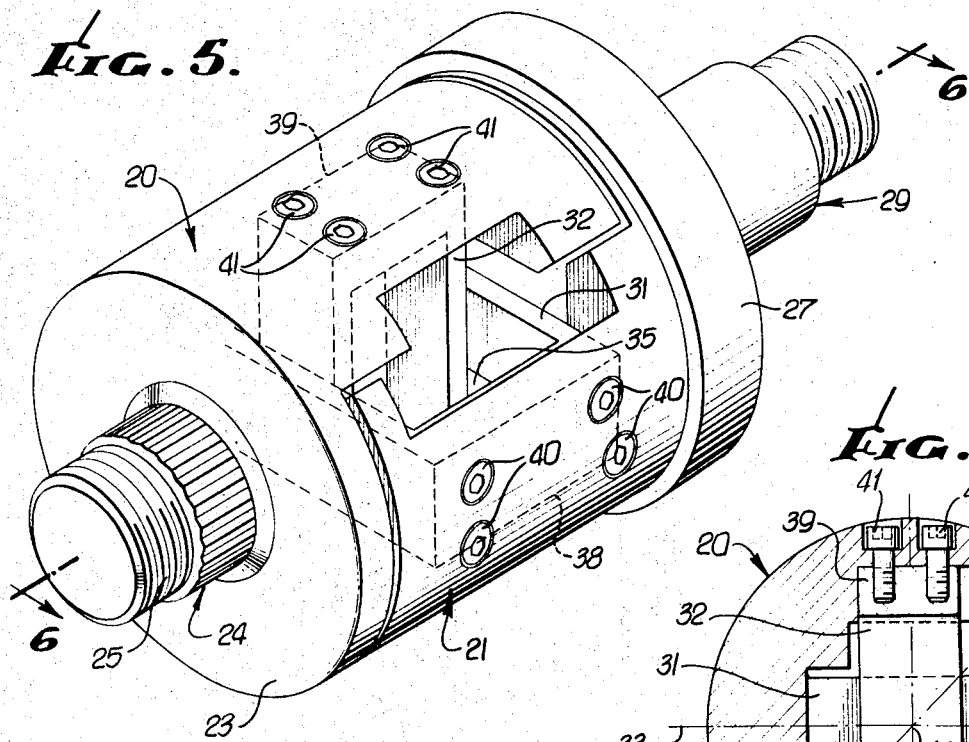
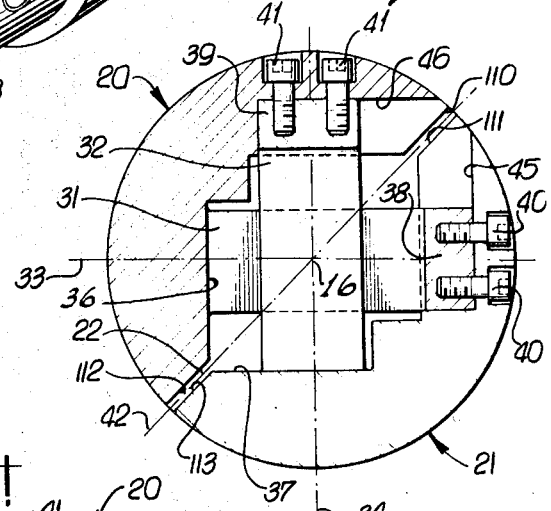
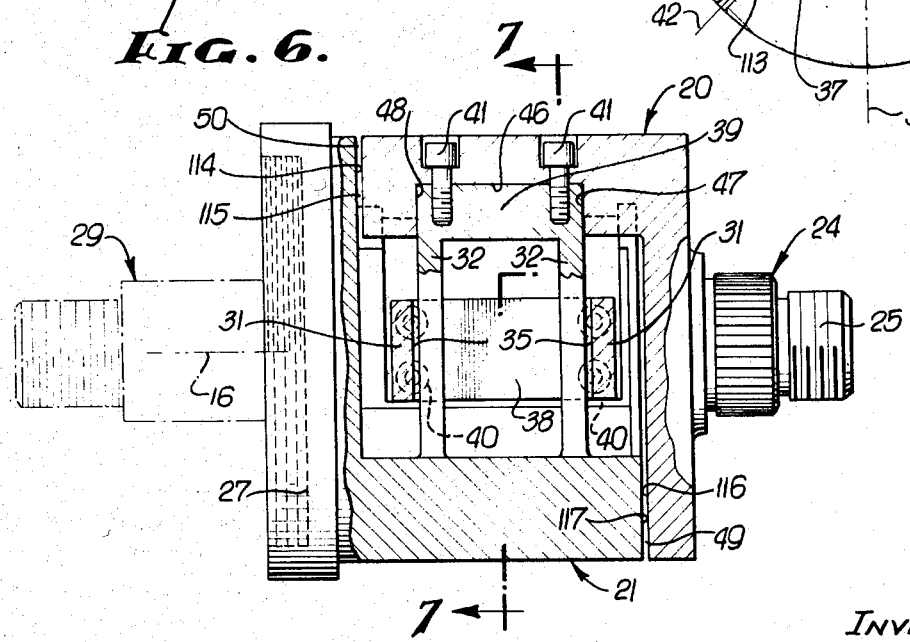

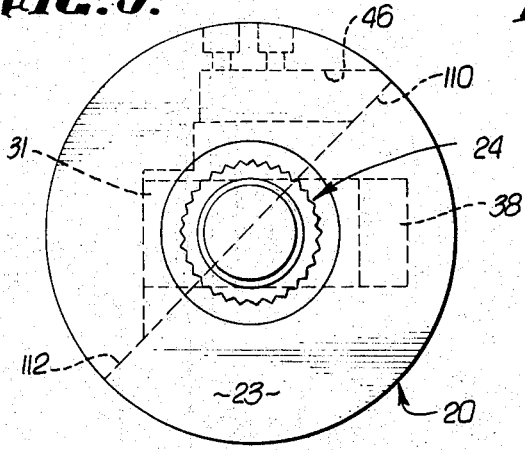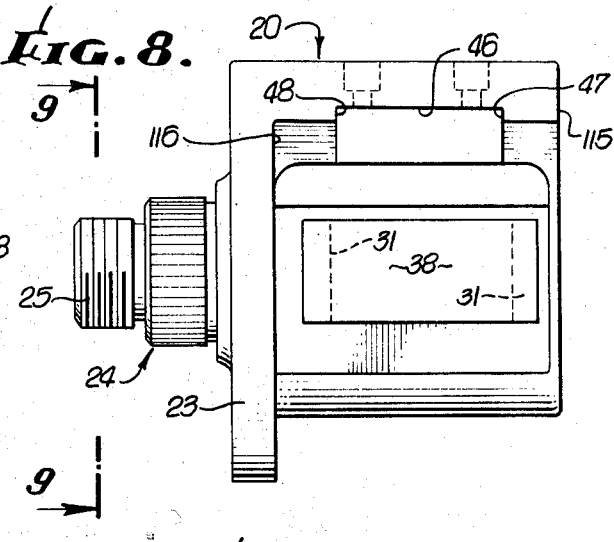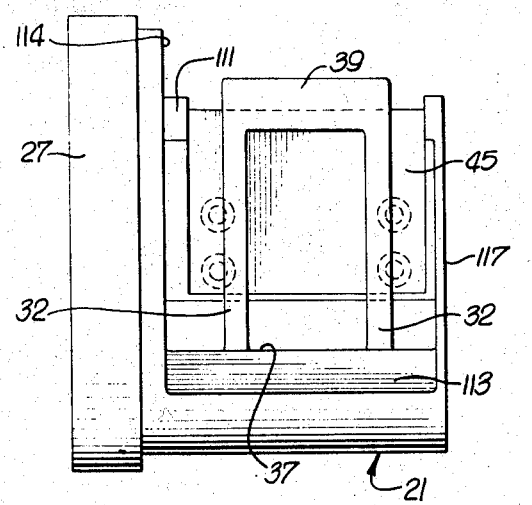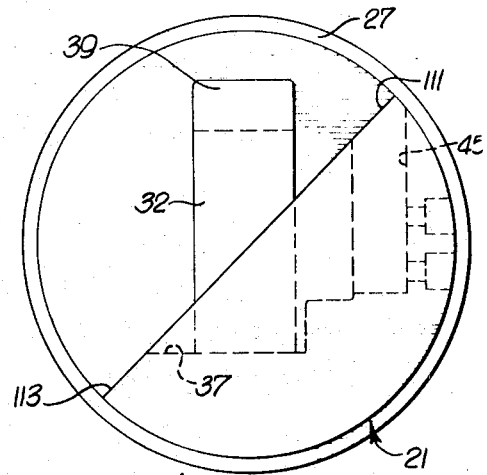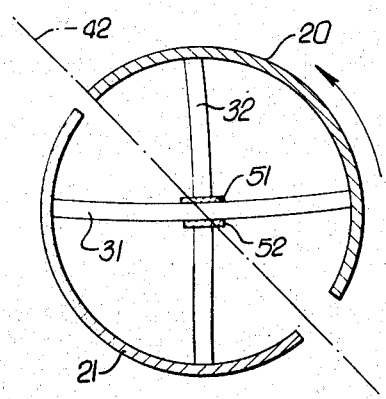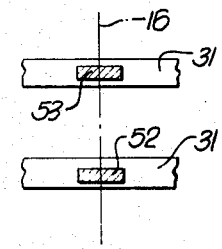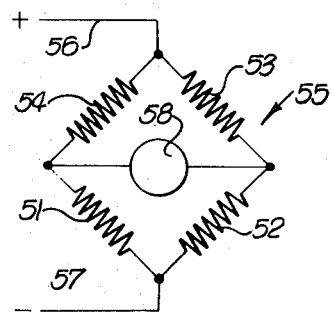
INVENTORS.
HOWARD E. WARD
MARI A. WOLF
BY White & Haefliger
ATTORNEYS.

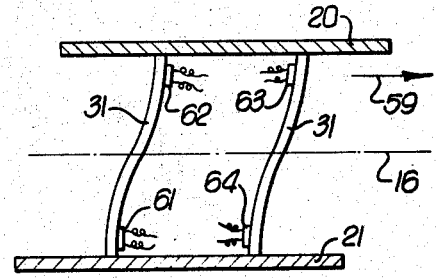
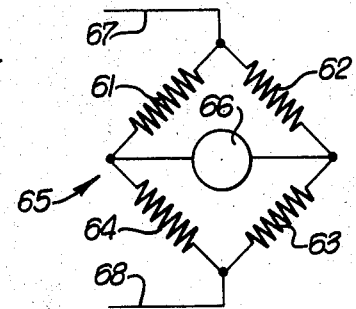
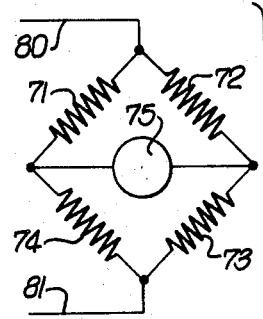
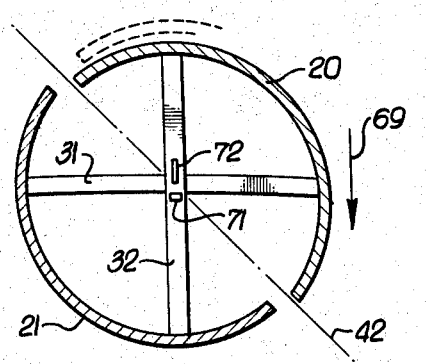
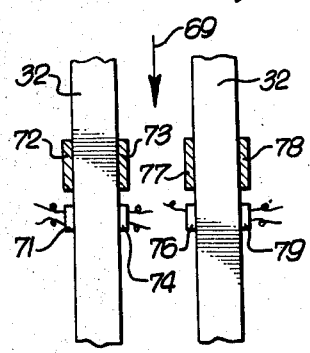
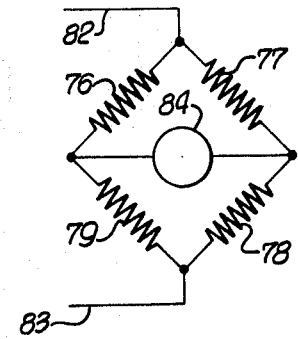
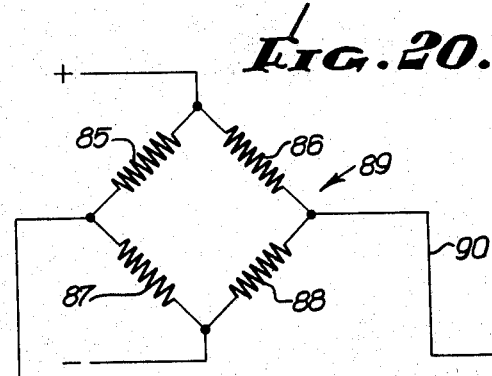
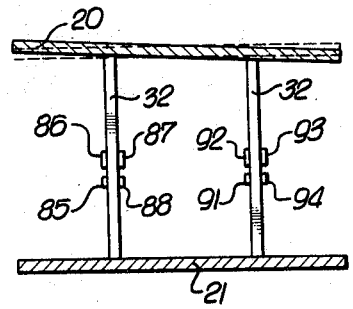

United States Patent Office 3,561,263
Patented Feb. 9, 1971

3,561,263
FORCE AND MOMENT DYNAMOMETER
Howard E. Ward, Tustin, and Mari A. Wolf, Santa Ana, Calif., assignors to Task Corporation, Anaheim, Calif., a corporation of Pennsylvania
Filed Aug. 8, 1968, Ser. No. 751,173
Int. Cl. G01l 5/22
U.S. Cl. 73—133       12 Claims

ABSTRACT OF THE DISCLOSURE

A force dynamometer of extreme simplicity and small size, employing crossed pairs of beams, and capable of measuring multiple force and moment components.

BACKGROUND OF THE INVENTION

This invention relates generally to force and moment dynamometers, and more particularly concerns the elimination of problems associated with prior devices of this sort through the provision of an extremely simple dynamometer capable of use for measuring six force and moment components.

Force and moment dynamometers are devices used in measuring forces resolvable into X, Y and Z axis components, as well as moments resolvable into components about those axes. Such devices include members subjected to tension, compression, bending and torsion, and to which strain gages may be attached as by bonding, for producing electrical signals corresponding to the stress produced strain in such members.

Generally speaking, the size and complexity of such dynamometers tend to increase with the number of force and moment components sought to be measured. Also, it has been thought necessary in the past to use rather complex flexure pivots in such devices in order to produce isolation (i.e. reduce interaction or "cross talk") of strains produced in different members by different force and moment components, for reducing measurement error. Accordingly, the ends of improved accuracy were believed to be attainable only at the expense of increased size and complexity. This presented serious problems in those instances where an accurate dynamometer was required to be placed or fitted into a small space (as for example a hole bored or formed in existing equipment to be subjected to force and moment analysis). Also, the required complexity of such devices has made them almost prohibitively expensive.

SUMMARY OF THE INVENTION

It is a major object of the invention to overcome the above as well as other problems through the provision of a force and moment dynamometer employing relatively crossed pairs of beams to which strain gages are attachable and characterized in its construction and operation by extreme simplicity and small size in relation to its capacity to accurately measure all six possible force and moment components. As will be seen, the dynamometer finds one particularly advantageous use in accurately measuring forces and moments to which an aircraft pilot's steering wheel is subjected.

Basically, the new dynamometer comprises a pair of body sections which are relatively movable along and about a principal longitudinal axis, there being lateral spacing between the sections; first means interconnecting the sections including a first pair of load transmitting beam members (to which gages are attachable) spaced along that axis and extending transversely thereof; second means interconnecting the sections including a second pair of load transmitting beam members (to which gages are attachable) spaced along the axis and extending transversely thereof; the transverse directions of the first members being rotated about the axis relative to the transverse directions of the second members; each member being free of flexure pivots along its length and the members being adapted to bend in restraining relative movement of the sections. As will appear, the body sections may advantageously be semi-cylindrical with spacing to define a so-called third axial plane which projects between first and second axial planes defined by the first and second pairs of beam members respectively. As a result, the sections and members may be very easily mesh assembled and disassembled, with attached strain gages and wires.

Additional features of the invention include the provision of cross pieces interconnecting the projecting terminals of the beam members of each pair as well as fasteners interconnecting the cross pieces with the inner sides of the body sections, all in such manner that the second beam members and associated cross piece may be assembled through an opening formed by the first beam members and associated cross piece, during interconnection of the two body sections.

These and other objects and advantages of the invention, as well as the details of illustrative embodiments, will be more fully understood from the following detailed description of the drawings, in which:

BRIEF DESCRIPTION OF THE DRAWING

FIG. 5 is a view like FIG. 3, but showing the opposite side of the device;

FIG. 6 is a vertical section taken on line 6—6 of FIG. 5;

FIG. 7 is a vertical section taken on line 7—7 of FIG. 6;

FIG. 8 is a side elevation of one section of the FIG. 5 dynamometer;

FIG. 9 is an end view of the FIG. 8 section, taken on lines 9—9 of FIG. 8;

FIG. 10 is a side elevation of another section of the FIG. 5 device;

FIG. 11 is an end view of the FIG. 10 base section, taken on lines 11—11 of FIG. 10;

FIG. 12 is a diagram illustrating relative rotation of the sections in response to roll moment application;

FIG. 12a is a horizontal view showing gaging of two parallel members interconnecting the sections;

FIG. 13 is a bridge circuit showing the locations of the FIG. 12a strain gages therein;

FIG. 14 is a diagram illustrating relative axial deflection of the sections in response to axial force application;

FIG. 15 is a bridge circuit showing the locations therein of strain gages applied to certain parallel members interconnecting the sections in FIG. 14;

FIG. 16 is a diagram illustrating relative deflection of the sections in response to normal force application;

FIG. 17 is a view of a single beam member of FIG. 16 with strain gages bonded thereto;

FIG. 18 is a bridge circuit showing the locations therein of the strain gages seen in FIG. 17;

FIG. 19 is a diagram illustrating relative deflection of the sections in response to pitching moment application; and FIG. 20 is a bridge circuit showing the locations therein of the strain gages bonded to beam members of FIG. 19.

DESCRIPTION OF THE PREFERRED EMBODIMENTS

Figure 1:
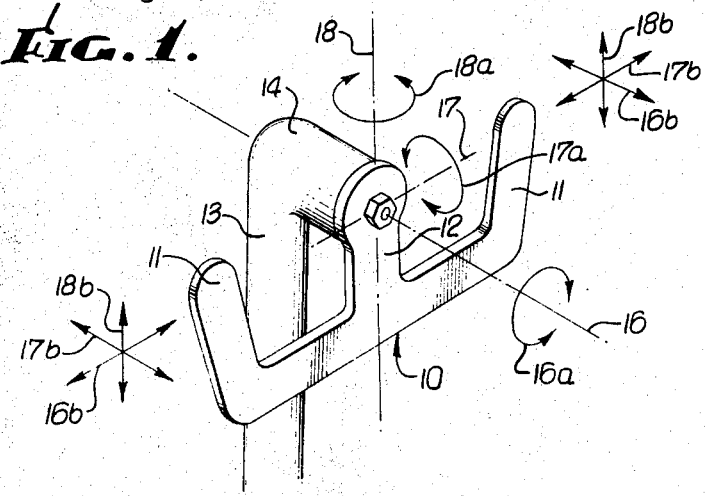
FIG. 1 is a perspective showing of a pilot's wheel assembly.

Referring first to FIG. 1, a pilot's steering wheel 10 is shown as having handles 11 and a center strut 12 attached to the steering post 13 having a neck 14. The attachment is effected via the force dynamometer 15 which is diagrammatically illustrated in FIG. 2. The dynamometer may be used for measuring any or all of three mutually perpendicular force components, as well as three moments. The force components are typically directed along axes 16, 17 and 18, and the moments are taken about those axes, as indicated by the circular arrows 16a, 17a, and 18a. The forces along those axes are indicated by the arrows 16b, 17b and 18b.

Figure 2:
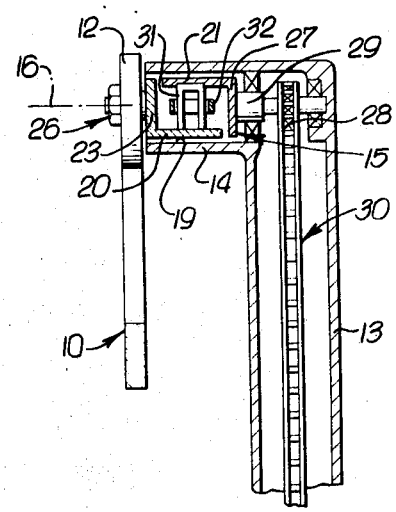
FIG. 2 is a vertical section showing the dynamometer of the invention installed in the pilot's wheel assembly of FIG. 1.
Figure 3:
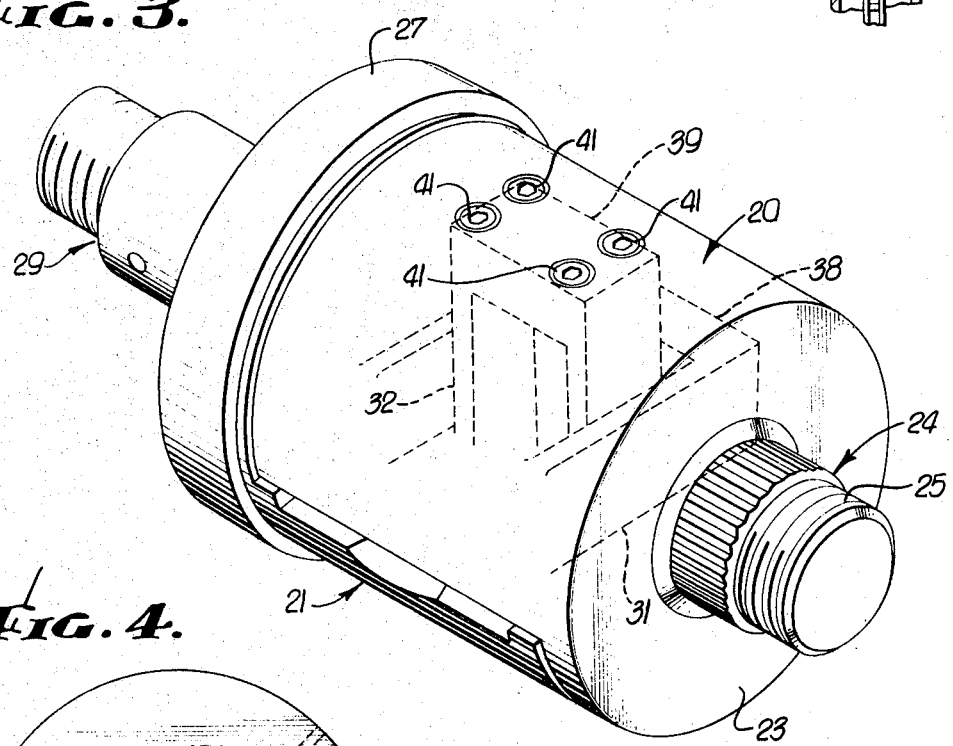
FIG. 3 is a perspective illustration of a dynamometer incorporating the invention showing one side of the device.
Figure 4:
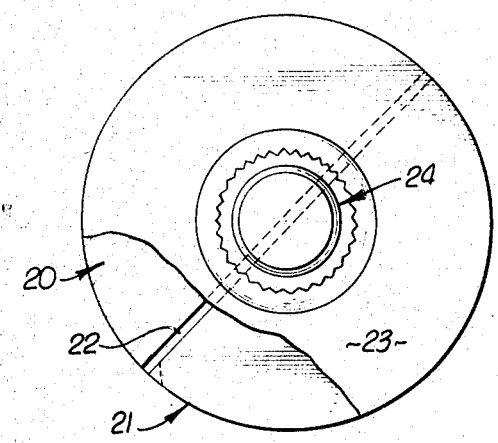
FIG. 4 is an end view of the FIG. 3 dynamometer.

As seen in FIG. 2, and as will appear, the dynamometer is especially adapted, due to its small size, to be fitted within the bore 19 of the neck 14. Extending the description to FIGS. 5–7, the dynamometer includes a pair of body sections, typically semi-cylindrical, and indicated at 20 and 21. The sections are relatively movable along and about the principal longitudinal axis 16, there being lateral spacing 22 between the sections. Body section 20 may be referred to as the wheel section in that an end plate 23 is integral therewith and fastened to the pilot's wheel 10. Note in this regard that a fastener 24 projects from the plate 23 and includes a threaded stud 25 to which a nut 26 is attached for connecting section 20 to the wheel 10. Body section 21 may be referred to as the base section, in that an end plate 27 integral therewith is attached to the rotary sprocket 28 which is bearing supported in fixed position within the post 13. A fastener 29, which is integral with base 27, effects such attachment to the sprocket, whereby as the pilot wheel turns about axis 16, the sprocket is turned to move a coupling such as chain 30. Since the pilot's wheel may move the post and sprocket only via force transmission by the dynamometer, the latter is usable to measure the six forces and moment components described above.

The dynamometer includes first means interconnecting the sections incorporating a first pair of load transmitting beam members 31, as well as second means interconnecting the sections incorporating a second pair of load transmitting beam members 32. The members 31 are spaced apart along the axis 16 and extend transversely thereof. Similarly, the members 32 are spaced apart along the axis 16 and extend transversely thereof; however, the transverse directions of the first members 31 are rotated about the axis 16 relative to the transverse directions of the second members 32. In this regard, the members 31 may be considered to define a first axial plane 33 bisecting them, and the members 32 similarly define a second axial plane 34 bisecting them, the two planes 33 and 34 typically extending mutually perpendicularly.

It is an important aspect of the invention that the body sections and beam members have such a closely interfitting relationship as to provide an extremely compact dynamometer. This object is served by the extension of the members 32 transversely between the members 31 and through an opening or space 35 between the members 31. Also, it will be noted that the members 31 project rightwardly in FIG. 7 from an inner face 36 of the body section 20, whereas the members 32 project upwardly from an inner face 37 of the body section 21. Further, a longitudinally extending cross piece 38 rigidly interconnects projecting terminals of the members 31, and a longitudinally extending cross piece 39 rigidly interconnects the terminals of the members 32. The respective cross pieces may be formed integrally with the respective beam members; however they are attachable as by fasteners 40 and 41 to the opposite body sections as shown in FIG. 7. Accordingly, each of the body sections may be easily formed with its associated beam members and cross piece openly exposed for machining, and thereafter the sections may be interfitted to enclose the beam members internally, the fasteners 40 and 41 rigidly integrating the sections into an assembled dynamometer unit. A characteristic of the resultant dynamometer is the definition of a third axial plane 42. Each of the planes 33, 34 and 42 is partly defined by longitudinal axis 16. Plane 33 bisects members 31; plane 34 bisects members 32; and plane 42 bisects the lateral spacing between the body sections 20 and 21. Note that cross piece 38 is received against inner face 45 of body section 21, and cross piece 39 is received against inner face 46 of body section 20. Those inner faces 45 and 46 may be recessed in the respective body sections as, for example, is made clear in FIG. 6, whereby the cross pieces may also fit between longitudinally spaced shoulders as, for example, are formed at 47 and 48 to receive the cross piece 39.

It should further be noted that a slot 49 extends between the end plate 23 and the body section 21, and a slot 50 extends between the end plate 27 and the body section 20. The slots 49 and 50 are longitudinally spaced and define transverse planes perpendicular to axis 16. Accordingly, the sections 20 and 21 are interconnected only through the beam members 31 and 32.

Referring now to FIG. 12, if body section 20 is rotated relative to section 21 as indicated, the beam members 31 and 32 will flex slightly. Beam members 31 are shown in FIG. 12a as having strain gages 51–54 bonded to their laterally opposite sides as shown, and such gages may be connected in the bridge circuit 55, as seen in FIG. 13. When electrical potential is applied to the input leads 56 and 57, the straining of such gages will produce resistance changes providing a characteristic output at galvanometer 58 indicative of the degree of the moment and force applied to the body section 20, about axis 16.

In FIG. 14, the body section 20 is subjected to axial force and displacement in the direction of arrow 59, and relative to the section 21. In this instance the beam members 31 may have gages 61–64 applied thereto, as indicated, to strain in response to beam member flexing. The gages may be connected in the bridge seen at 65 in FIG. 15 for producing a characteristic output at the galvanometer 66 when an input potential is applied to the input leads 67 and 68. The output corresponds to the degree of axial force application.

In FIG. 16, normal force is applied to section 20 in the direction of arrow 69, acting to compressively load the beam members 32. Gages 71–74 and 76–79 may be bonded to the members 32, as seen in FIGS. 16 and 17, and may be connected in the bridge circuit as seen in FIG. 18 to provide output at 76 and 84 when input potential is applied to the leads 80–81 and 82–83. The added and averaged output of the gaged beam members indicates the degree of normal force applications. In a similar manner side force application may be measured on beam members 31.

Finally, the pitching moment may be measured in the manner indicated in FIGS. 19 and 20. In that example, the section 20 is subjected to a moment about transverse axis 17 (as referred to FIG. 1), and relative to section 21. The beam members 32 may then be gaged as indicated at 85–88 and 91–94, and the gages interconnected in two bridge circuits 89 and 95, as seen in FIG. 20. The outputs 90 and 96 of the circuits are passed to a galvanometer 100, which detects the difference between such outputs as a measure of pitching moment. In a similar manner, yawing moment may be detected on beam members 31.

Referring back to FIG. 7, the sections have stop shoulder pairs 110 and 111, and 112 and 113 which are interengageable to limit relative displacement if the sections as described in connection with FIGS. 12, 16 and 19. Also, as seen in FIG. 6, the sections have stop shoulder pairs 114 and 115, and 116 and 117 operable to limit relative displacement of the sections tending to close the gaps 49 and 50 as described in connection with FIG. 14.

We claim:

1. In a force dynamometer,
   a pair of body sections which are relatively movable along and about a principal longitudinal axis,
   first means interconnecting said sections including a first pair of load transmitting beam members longitudinally spaced along said axis and extending transversely thereof,
   second means interconnecting said sections including a second pair of load transmitting beam members longitudinally spaced along said axis and extending transversely thereof,
   the transverse directions of said first members being rotated about said axis relative to the transverse directions of said second members, the longitudinal spacing of the beam members of one of said pairs exceeding the longitudinal spacing of the beam members of the other of said pairs,
   each member being free of flexure pivots along its length and said members adapted to bend in restraining relative movement of said sections.

2. The dynamometer of claim 1 wherein said second means includes one cross piece rigidly interconnecting projecting terminals of said second members, and a fastener interconnecting said cross piece to the inner side of a first of said sections.

3. The dynamometer of claim 2 wherein said first means includes another cross piece rigidly interconnecting projecting terminals of said first members, and a fastener interconnecting said other cross piece to the inner side of a second of said sections.

4. The dynamometer of claim 1 wherein said members have transversely elongated flat sides, and including strain gages bonded to said sides at locations such that bridge interconnection of the gages reduces error due to member deflection interaction.

5. In a force dynamometer,
   a pair of body sections which are relatively movable along and about a principal longitudinal axis, there being lateral spacing between said sections,
   first means interconnecting said sections including a first pair of load transmitting beam members spaced along said axis and extending transversely thereof,
   second means interconnecting said sections including a second pair of load transmitting beam members spaced along said axis and extending transversely thereof,
   the transverse directions of said first members being rotated about said axis relative to the transverse directions of said second members,
   each member being free of flexure pivots along its length and said members adapted to bend in restraining relative movement of said sections,
   said second means including one cross piece rigidly interconnecting projecting terminals of said second members, and a fastener interconnecting said cross piece to the inner side of a first of said sections,
   said first means including another cross piece rigidly interconnecting projecting terminals of said first members, and a fastener interconnecting said other cross piece to the inner side of a second of said sections,
   said first section, first members and other cross piece forming an opening through which said second members project transversely.

6. In a force and moment dynamometer,
   a pair of semi-cylindrical body sections, which are relatively movable along and about a central longitudinal axis common to said sections, said sections being laterally spaced apart,
   first means interconnecting said sections including a first pair of load transmitting beam members spaced apart along said axis and extending transversely thereof,
   second means interconnecting said sections including a second pair of load transmitting beam members spaced apart along said axis and extending transversely thereof,
   the transverse directions of said first members being rotated about said axis relative to the transverse directions of said second members, the longitudinal spacing of the beam members of one of said pairs exceeding the longitudinal spacing of the beam members of the other of said pairs,
   each member being free of flexure pivots along its length and said members adapted to bend in restraining relative movement of said sections.

7. The dynamometer of claim 6 wherein there are first, second and third axial planes partly defined by said axis, the first plane bisecting said first members, the second plane bisecting said second members, and the third plane bisecting the lateral spacing between said body sections.

8. The dynamometer of claim 7 wherein said second means includes a longitudinally extending cross piece rigidly interconnecting projecting terminals of said second members, and a fastener interconnecting said cross piece to the inner side of a first of said sections.

9. The dynamometer of claim 8 wherein said first means includes another longitudinally extending cross piece rigidly interconnecting projecting terminals of said first members, and a fastener interconnecting said other cross piece to the inner side of a second of said sections.

10. The dynamometer of claim 6 including longitudinally spaced end plates integral with the respective sections and carrying fastener means.

11. The dynamometer of claim 10 including an aircraft pilot's wheel having an axis coincident with said longitudinal axis and to which one of said end plates is fastened.

12. In a force and moment dynamometer, a pair of semi-cylindrical body sections, which are relatively movable along and about a central longitudinal axis common to said sections, said sections being laterally spaced apart.
    first means interconnecting said sections including a first pair of load transmitting beam members spaced apart along said axis and extending transversely thereof,
    second means interconnecting said sections including a second pair of load transmitting beam members spaced apart along said axis and extending transversely thereof,
    the transverse directions of said first members being rotated about said axis relative to the transverse directions of said second members,
    each member being free of flexure pivots along its length and said members adapted to bend in restraining relative movement of said sections,
    there being first and second axial planes, partly defined by said axis, the first plane bisecting said first members and the second plane bisecting said second members,
    said second means including a longitudinally extending cross piece rigidly interconnecting projecting terminals of said second members, and a fastener interconnecting said cross piece to the inner side of a first of said sections, said first means including another longitudinally extending cross piece rigidly interconnecting projecting terminals of said first members, and a fastener interconnecting said other cross piece to the inner side of a second of said sections, said first sections, first members and other cross piece forming an opening through which said second members project transversely.

References Cited

UNITED STATES PATENTS

| | | | |
|---|---|---|---|
| 3,100,990 | 8/1963 | Dimeff | 73—147 |
| 3,181,918 | 5/1965 | Troeger | 308—2 |
| 3,212,329 | 10/1965 | Bisberg | 73—189 |
| 3,360,255 | 12/1967 | Ormond | 308—2X |
| 3,427,875 | 2/1969 | Saxl | 73—141 |
| 3,434,342 | 3/1969 | Kazmarek | 73—133 |
| 3,460,383 | 8/1969 | Padera | 73—147 |

OTHER REFERENCES

German Printed Application No. 1,245,167, pub. July 1967.

CHARLES A. RUEHL, Primary Examiner

U.S. Cl. X.R.

308—2